(12) United States Patent
Anderson et al.

(10) Patent No.: US 6,657,184 B2
(45) Date of Patent: Dec. 2, 2003

(54) OPTICAL NAVIGATION UPON GRAINY SURFACES USING MULTIPLE NAVIGATION SENSORS

(75) Inventors: Mark A Anderson, Ft Collins, CO (US); Brian J. Misek, Ft. Collins, CO (US); Allen C. Norskog, Fort Collins, CO (US); Zachary Dietz, Logmont, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 21 days.

(21) Appl. No.: 10/000,604

(22) Filed: Oct. 23, 2001

(65) Prior Publication Data

US 2003/0075674 A1 Apr. 24, 2003

(51) Int. Cl.[7] ............................. G06M 7/00; G09G 5/08; H04N 1/024
(52) U.S. Cl. .................... 250/221; 250/208.1; 250/557; 358/473; 345/166
(58) Field of Search ................................. 250/221, 234, 250/235, 208.1, 557; 345/156, 161, 163, 166; 358/473

(56) References Cited

U.S. PATENT DOCUMENTS

| | | | |
|---|---|---|---|
| 5,578,813 A | * | 11/1996 | Allen et al. |
| 5,786,804 A | | 7/1998 | Gordon |
| 5,994,710 A | * | 11/1999 | Knee et al. |
| 6,005,681 A | * | 12/1999 | Pollard |
| 6,057,540 A | | 5/2000 | Gordon et al. |

OTHER PUBLICATIONS

Publ. #0179823, SN 09/845,544, filed Apr. 2001, Zachary Dietz et al, Image Filters and Source of Illumination for Optical Navigation upon Arbitrary Surfaces are Selected According to Analysis of Correlation during Navigation, assigned to Agilent Technologies, Inc.

* cited by examiner

*Primary Examiner*—David Porta
*Assistant Examiner*—David C. Meyer
(74) *Attorney, Agent, or Firm*—Edward L. Miller

(57) ABSTRACT

A mouse for navigating upon grainy surfaces is equipped with at least two optical navigation circuits having different views of the work surface and whose axes may be non-parallel. For each navigation circuit an indication of navigation impairment owing to grain is detected. A suitable algorithm chooses from among the various navigation circuits which one's output to use. The multiple optical navigation circuits can each be separate self-contained mechanisms on separate dies or they can be separate sections of a single integrated circuit. The various metrics used within a navigation circuit for spatial filter selection can be further used by the navigation circuit selection algorithm. Each optical navigation circuit can have its own light source, or they can share a common one. They may also share any imaging optics, although each navigation sensor sees a different image. If the optical navigation sensors have non-parallel axes, their indications of incremental movement are converted to a common framework within the mouse as an adjunct to the navigation selection algorithm.

5 Claims, 2 Drawing Sheets

OPTICAL NAVIGATION UPON GRAINY SURFACES USING MULTIPLE NAVIGATION SENSORS

REFERENCE TO RELATED APPLICATIONS

The subject matter of the instant Application is related to that of U.S. Pat. No. 6,057,540 entitled MOUSELESS OPTICAL AND POSITION TRANSLATION TYPE SCREEN POINTER CONTROL FOR A COMPUTER SYSTEM filed Apr. 30, 1998, and is also related to the subject matter described U.S. Pat. No. 5,578,813 filed Mar. 2, 1995, issued Nov. 26, 1996 and entitled FREEHAND IMAGE SCANNING DEVICE WHICH COMPENSATES FOR NON-LINEAR MOVEMENT. This Application is also related to the subject matter described in U.S. Pat. No. 5,786,804, issued on Jul. 28, 1998, filed Oct. 6, 1995, entitled METHOD AND SYSTEM FOR TRACKING ATTITUDE, and also assigned to Hewlett-Packard Co. These three Patents describe basic techniques for the tracking of position movement, which techniques include components of the preferred embodiment described below. Accordingly, U.S. Pat. Nos. 6,057,540//5,578,813 and 5,786,804 are hereby incorporated herein by reference.

The notion of spatial filtering is also of significance in the instant Application. The use of spatial filtering in connection with the optical navigation techniques of interest is explained in the U.S. Patent Application entitled IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION, Ser. No. 09/845,544, filed on Apr. 30, 2001 and assigned to Agilent Technologies Inc. Accordingly, U.S. patent application Ser. No. 09/845,544 is hereby incorporated herein by reference.

BACKGROUND OF THE INVENTION

Optical navigation produces motion signals indicative of relative movement along the directions of coordinate axes, and is becoming increasingly prevalent. It is used, for instance, in optical computer mice and fingertip tracking devices to replace conventional mice and trackballs for the position control of screen pointers in windowed user interfaces for computer systems. It has many advantages, among which are the lack of moving parts that accumulate dirt and suffer the mechanical wear and tear of use. A more recent advantage of an optical mouse is that it does not need a mouse pad, since modern optical navigation techniques are generally capable of navigating upon arbitrary surfaces, so long as those surfaces are not optically featureless.

The modern optical navigation techniques mentioned in the preceding paragraph operate by tracking the relative displacement of images. A two dimensional view of a portion of the surface is focused upon an array of photo detectors, whose outputs are digitized and stored as a reference image in a corresponding array of memory. A brief time later a sample image is also digitized. If there has been no motion, then the sample image and the reference image are identical (or very nearly so). What is meant, of course, is that the stored arrays appear to match up. If, on the other hand, there has been some motion, then the sample image will appear to have shifted within its borders, and the digitized arrays will no longer match (that is, if their borders are also lined up). The matching process is termed "correlation" and may be performed in various ways, one of which is described in the incorporated Patents. Considered in isolation, correlation answers the narrow question "Are these two images aligned?" When the answer is "No," it could be because of intervening motion in any direction, and some additional mechanism is needed to find the direction and amount of displacement that will produce correlation results of "Yes" or "Almost." What is done is to perform correlations between one of the stored images (say, the reference image) and a collection of shifted versions of the other (sample) image. The shifts are no shift, one over, one over and one up, one up, one over in the other direction, etc., for eight actual shifts and one "null" shift. We would then expect that one of these nine correlations would be better than all the others, and its direction and amount of shift is taken as an indication of the intervening motion. Collectively, the nine correlation values describe a "correlation surface".

The optical navigation mechanism maintains velocity (speed and direction) information. When a new sample frame is to be correlated with the reference frame a predicted shift can be used as the starting point for the nine shifts. With this arrangement the correlation results contribute to an updated velocity and either ratify or modify the motion just predicted. Prediction is used to "pre-shift" the reference frame, until such time as the new sample frame fails to overlap a significant portion of the shifted reference frame. At that time a new reference frame is taken. Prediction can be used to slow the sample rate down to conserve power (if the light source is pulsed, or can be turned off between samples) when the current velocity is low.

The basic technique described above works quite well when the surface produces images that appear as regions of light and dark defined by closed boundaries. The boundaries need not be abrupt; they can be gradual. And, if the shapes of the regions are sufficiently non-symmetrical or irregular, then any closure requirement for the boundaries can be relaxed. The shift and correlate mechanism may encounter difficulty, however, when there is a lot of symmetry and no closed boundaries. Say, for example, a mouse were navigating upon a wood grained desk. Under the right circumstances, the images presented to the correlator could appear to represent a series of parallel lines. The worst case scenario is that the spacing between the lines is regular and minimal, which obscures the effects of motion in a direction across the lines. Multi-bit resolution and interpolation can mitigate the problem, but these are not foolproof, and they are definitely not low cost. And, it is relatively difficult to detect motion in the direction along uniformly parallel lines. The result is an outfoxed mouse and a frustrated user. (To be fair, grainy surfaces are only sometimes troublesome. Much depends upon feature size, as well as orientation. Parallel features whose separation is less than the spacing between photo detectors are not resolved as separate entities. Difficult cases arise for parallel features that align with, say, every other (second) or every third photo detector. In general, the more the feature separation varies from those troublesome cases, the less difficulty arises. Bear in mind, then, that just because a surface is grainy does not mean that it can produce a difficult case.)

One solution to this occasional difficulty would be to increase the resolution with which images are represented. One might magnify the image more, increase pixel density, or digitize each pixel to a greater number of bits. The hope is that eventually what appears to be regular repeating (and thus indistinguishable) features become irregular (and thus distinguishable from one another). Each of these solutions has its own disadvantage, among which are increased cost and complexity, and a need for greater internal processing speed just to maintain tracking over the surface at a given rate of physical mouse motion.

Another technique that has been used to mitigate the grain/parallel line problem is (spatial) filtering the images before they are correlated. The idea is to modify the arrays to be correlated such that a regular pattern in the data is suppressed, at least in part. This allows the response of the correlation mechanism to be based more on irregular features in the image and less on regular recurring features that produce strong correlations not dependent upon motion. The idea is similar to filtering out a known strong signal to recover a weaker one. The filtering is performed by altering the values in the various positions of an array according to arithmetic combination with the values in symmetrically opposed positions disposed around the location of interest, and of necessity distorts or alters the image being tracked. This is acceptable, since we are not particularly interested in such fidelity, anyway. That is, we are never going to display to anyone the contents of the array as an image; we simply want to track it. The prior art contains different spatial filters usable in the manner we have just described, and once a suitable one has been identified by the designer it is simply incorporated as a permanent feature into the system.

Spatial filters have been used in optical mice to deal with the problem of parallel lines arising from, say, wood grain. They are generally effective in two orthogonal directions oriented relative to the spatial pattern with which the array of photo sensors is laid out, say parallel to the axes of the sensor array, or tilted at forty-five degree thereto. The incorporated '544 Application describes two such filters, and a method of switching between them. The idea is that each filter has a limited range of operation and the mouse can be fooled by the appearance of long parallel features that are better dealt with by the other filter. The switching, or filter selection mechanism, operates in response to the detection of axial and diagonal ridges in the correlation surface (the AR, DR and RM metrics described in the '544 Application).

Unfortunately, it is still possible for the system described in the '544 Application to occasionally get confused by a grainy surface. In its defense, we note that the filter switching system was developed for use in a (very) low cost mouse optical navigation sensor, where part of the low cost was achieved by having the filter output be but a single bit (!) of resolution. This resulted in a considerable collateral reduction in complexity for the arithmetic circuitry needed for correlation. If multiple bit precision were retained it is quite likely that the performance of the multiple filter technique would improve correspondingly, possibly to the point where no further improvements would be felt necessary. As it is, however, multiple bit precision presently precludes the notion of very low cost (chip size goes up rapidly with all the additional arithmetic circuitry), leaving us to consider what might be done to further alleviate the effects of grain with only a modest increase in sensor cost. What to do?

SUMMARY OF THE INVENTION

A solution to the problem of optically navigating a mouse or the like upon grainy surfaces is to: First, equip the mouse with at least one additional optical navigation circuit whose field of view is different and whose axes are possibly oriented at an angle to those of the original optical navigation circuit and; Second, detect for each navigation circuit an indication of navigation impairment owing to grain, and; Third, navigate according to a suitable algorithm that chooses from among the various navigation circuits which one's output to use. The multiple optical navigation circuits can each be separate self-contained mechanisms on separate dies, or preferably, they can be separate sections of a single integrated circuit. The various metrics used for filter selection can be further used by the navigation circuit selection algorithm. Each optical navigation circuit can have its own light source, or preferably, they can share a common one. Preferably, they also share any imaging optics. In any event, if the optical navigation sensors are oriented such that their respective axes are not parallel, then their indications of incremental (mouse) movement must be converted to a common framework before use. That conversion can be performed within the mouse as an adjunct to the navigation selection algorithm.

DESCRIPTION OF A PREFERRED EMBODIMENT

Figure 1:
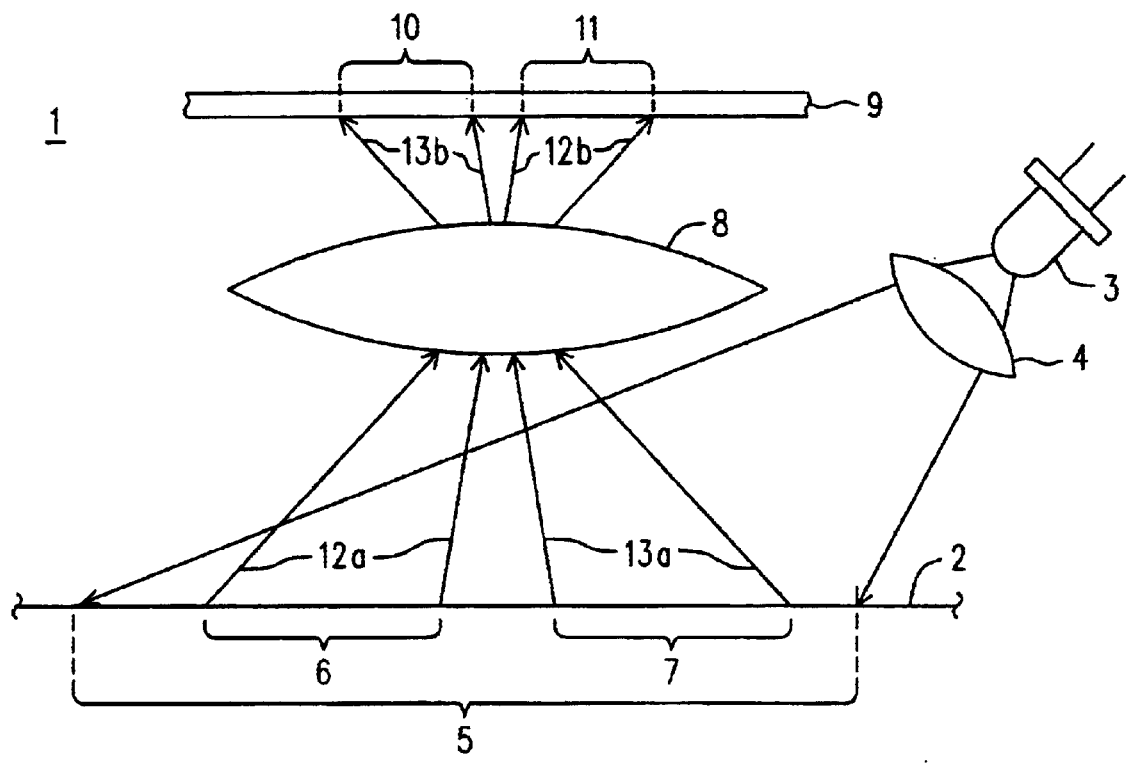
FIG. 1 is a side view of optical paths within a portion of a mouse that has a plurality of optical navigation circuits to aid in navigating upon grainy surfaces.

Refer now to FIG. 1, wherein is shown a side view 1 of a portion of an optical navigation apparatus, such as for a mouse, constructed in accordance with the invention. In particular, note that a work surface 2, such as the wooden top of a desk, is illuminated by a light source such as an LED (Light Emitting Diode). The light from the LED 2 is directed by a suitable lens 4 onto an illuminated region 5 that is part of whatever portion of work surface 2 presently underneath the mouse (the mouse itself is not shown in its entirety).

Disposed above the work surface 2 is a navigation IC (Integrated Circuit) 9 that includes arrays 10 and 11 of optical sensors (each of which is composed of, say, sixteen by sixteen photo-transistors). Associated with each array is a remaining portion of navigation circuitry, which may preferably includes the features set out in the incorporated Patents and Applications, including selectable spatial filtering. Preferably, IC 9 is a single IC that carries two (or perhaps more) imaging and navigation mechanisms of the sort described, but it might also be the case that two or more individual imaging and navigation ICs could be assembled onto a substrate or circuit board. In any event, it is preferred that the arrays 10 and 11 be sufficiently close together that a single lens 8 serves to focus light 12a from area 6, as well as light 13a from area 7, both being portions of illuminated region 5, respectively onto arrays 11 and 10 as images 12b and 13b. This is desirable for economy, and cooperates well with other optical circumstances in the mouse (depth of field for lens 8, etc.) that combine to make the optical arrays 10 and 11 "look straight down," or almost "straight down" toward the work surface 2. Furthermore, with a single lens 8 and two separate arrays 10 and 11, it is most likely, and indeed preferable, that areas 6 and 7 be disjoint, although in close proximity to one another. That is, if there were two lenses in place of a single lens 8, and say arrays 10 and 11 were on separate ICs, then areas 6 and 7 could in principle be at opposite ends of the mouse. We don't say that such is a bad idea, but rather that we prefer to have them near each other. The reason is this. If one navigation mechanism begins to have trouble with grain that is oriented a certain way, then the we can expect that it is likely that the other navigation mechanism will encounter grain that is probably oriented about the same way (by a sort of principle of locality). If, however, the two navigation mechanisms have axes that are inclined to each other, which amount of inclination would preferably be by forty-five degrees, and (preferably) each has its own spatial filtering that it selects for best performance (as taught in the '544 Application), then it is not unreasonable to expect that the alternate navigation mechanism might perform better on grain of this orientation. If it doesn't (and we can't guarantee that it will) then the mouse may do what it might have done anyway—exhibit a brief period of dementia where it fails to move the screen pointer even though it is itself in motion.

Some comments are in order here, before proceeding. First, areas 6 and 7 could be widely separated, with rationale being that we simply take our output from the navigation mechanism that is working the best when one or the other is troubled by grain. That would certainly be a reasonable approach. It does incur the extra cost of not allowing the common optics, however, and might not use a single IC for all the navigation mechanisms. The wider the separation, however, the less likelihood there is that angling the axes of the different navigation mechanisms has substantial benefit; the main benefit may arise simply from the diversity of views. If the axes remain aligned, we are also free of needing to rotate coordinates, which is itself an advantage.

Next, one might observe that: In selecting between navigation sensors that view nearly adjacent areas 6 and 7, but that have non-parallel axes, we are (almost, anyway) performing the equivalent of a rotation between a grainy work surface and the navigation sensor. Indeed, it would in fact be so (assuming no mouse motion), if the source of illumination changed in concert with the selection of a sensor so as to remain in a fixed position relative thereto. (If there is mouse motion, however, its direction of motion relative to the grain would not change.) To this point we have not said that the light source might move as the different navigation mechanisms are selected, and herewith fix that. Additionally, we note that the grain trouble seems worst when the light strikes the grain from right angles, as opposed to from a direction along the axis of the grain. (The reason appears to be the production of long skinny shadows that appear as parallel lines.) Thus, although switching from one navigation mechanism to another, with its different image and filter choices, may be sufficient, it is not the most aggressive solution. That, it would seem, would also involve moving the light source. The incorporated '544 Application discloses, within a single navigation mechanism, moving the location of the light source as different filters are selected. We could extend that idea to illuminate with different LEDs as correspondingly different navigation mechanisms were selected. This would maximize the likelihood that its image were useable, either by ensuring that it was illuminated from "end on" or mostly so, as opposed to from the side, or by simply allowing the greatest number of possibilities from which to select the one that works the best.

Despite its attractions, this idea is not without constraints. Suppose that for reasons related to power consumption (say, in a cordless battery powered mouse), the light sources were pulsed, so that they were mostly off during times of no or low velocity and between instances of samples (i.e., illuminate and sample in response to measured velocity, so as to not lose tracking). It is most probable that there is an exposure control loop that sets exposure time to maximize image contrast. It requires training, or time to acquire its set point, and switching between light sources may incur the overhead of re-training. A similar situation may arise with "electronic shutters" even if the light source is on continuously. On the other hand, system performance may be sufficiently fast that no undue velocity limits are placed on the mouse.

It will be noted that the situation becomes less complex if there is just one light source that is on continuously, shared by two navigation mechanisms that each have their own (i.e., independently servoed) electronic shutter for exposure control. A single light source will maximize the production of highlights and shadows, which for navigation on fabric or paper is ordinarily a good thing. However, long skinny shadows from the sideways illumination of grain might be less desirable than filling the shadows with end-on illumination and navigating on variations in surface reflectivity owing to material composition (akin to color variations). In this case one would have multiple light sources and simply leave them on, or pulse them, according to the scheme in use.

Lastly, one may wonder about the effects on screen pointer positioning when time is taken to switch from one navigation mechanism to the another; surely some amount of mouse motion is lost in the process. Indeed there is. But remember that the navigation mechanisms can sample upwards of 1500 times a second, and that even at moderately high mouse velocities the screen pointer's position is changed by only a few pixels at a time. Add to this the notion that the user is moving his hand to servo the screen pointer toward a predetermined location in the display, and is not usually aware of, or concerned about, the exact correspondence between the motion and the position at any particular instant, then a few lost pixels of motion here and there are not noticed.

Figure 2:
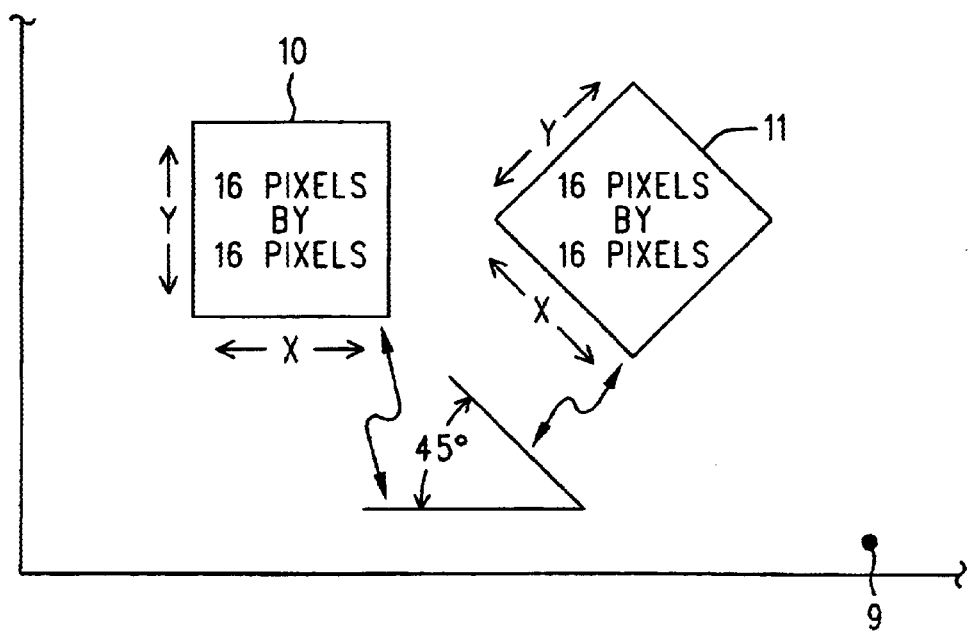
FIG. 2 is a plan view of how the axes of two optical navigation circuits for a mouse of FIG. 1 may be oriented.

To resume our discussion of the figures, then, refer now to FIG. 2, wherein is depicted a preferred orientation of the sensor arrays 10 and 11. As indicated in the figure, the angle of rotation between the respective axes of the two arrays of sensors is forty-five degrees. In general, the preferred amount of angular rotation for n-many arrays is 90°/n. It will be appreciated, however, that it is not necessary to incline the axes so that they are not parallel, and that, especially if the fields of view are widely separated, it may be desirable that the axes remain parallel to dispense with the need for coordinate rotation.

Figure 3:
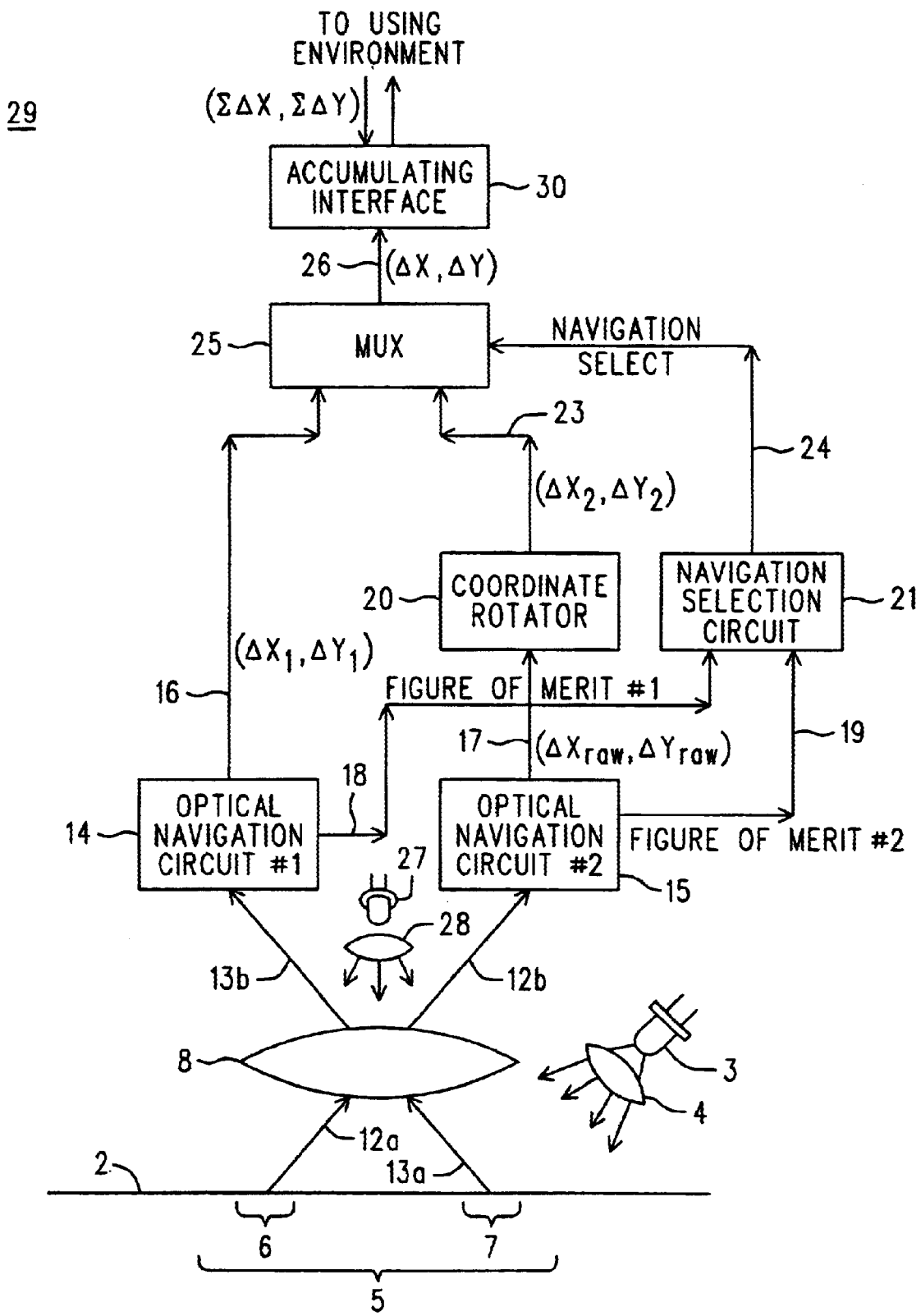
FIG. 3 is a simplified block diagram of how a mouse of FIG. 1 may be constructed such that it selects which optical navigation circuit is to send coordinates to an interested environment, based on a figure of merit signal obtained from each optical navigation circuit.

Assume now that there are two Optical Navigation Circuits, one optionally angled at 45° to the other, and refer to FIG. 3. FIG. 3 is a simplified preferred overall block diagram 29 for a system of the sort under consideration, and includes an optional second light source 27 and associated lens 28. Also shown in block diagram 29 are Optical Navigation Circuit #1 (14) and Optical Navigation Circuit #2 (15), which are optically coupled respectively to images 13 and 12 on work surface 2 via lens 8. For the sake of explanation, let us further assume that the Y axis of Optical Navigation Circuit #1 (14) is oriented parallel to the "long" axis of the mouse that the user would move "out" and "back" ("away" and "toward" himself) in order to produce up and down motion of the screen pointer, and that the X axis is parallel to "side-to-side" motion of the mouse. That is, the $(\Delta X_1, \Delta Y_1)$ coordinates produced by Optical Navigation Circuit #1 are just those you would expect if there were only a single Optical Navigation Circuit, and no second one. Under these circumstances (and assuming angled axes of 450) we are led to perform a rotation transformation (of 45°) on the incremental coordinates produced by (the second) Optical Navigation Circuit #2 (15). That rotation transformation is performed by a Coordinate Rotator Circuit 20, which circuit would be absent if the axes of the two navigation circuits were parallel. We agree that one could modify the internal operation of Optical Navigation Circuit #2 to include the functionality of Coordinate Rotator Circuit 20, but prefer to leave both Optical Navigation Circuits 14 and 15 as identical and as unchanged from an existing design (already used in a prior product) as possible. We shall say that Optical Navigation Circuit #1 (15) produces incremental coordinates ($\Delta X_1$, $\Delta Y_1$), Optical Navigation Circuit #2 produces incremental coordinates ($\Delta X_{raw}$, $\Delta Y_{raw}$) the Coordinate Rotator Circuit 20 produces incremental coordinates ($\Delta X_2$, $\Delta Y_2$). Streams of incremental coordinates ($\Delta X_1$, $\Delta Y_1$) and ($\Delta X_2$, $\Delta Y_2$) are applied to a multiplexer 26, from which one is chosen to be the ($\Delta X$, $\Delta Y$) 26 that will be sent, in accordance with a selection signal 24 (Navigation Select, and whose origins we shall discuss below), to an Accumulating Interface 30 and thence to the interested environment (e.g., a mouse driver in a computer).

A word is in order about the Accumulating Interface 30, which is a conventional item. The computer whose screen pointer is to be moved in accordance with mouse motion is under no obligation to accept every ($\Delta X$, $\Delta Y$) immediately as it is produced; to wait upon the mouse hand and foot, as it were. Instead, the computer's operating system will check for mouse results at convenient times. This means that successive instances of ($\Delta X$, $\Delta Y$) need to be accumulated and a ($\Sigma\Delta X$, $\Sigma\Delta Y$) sent to the computer when it is asked for. At that time the accumulations in the Accumulating Interface 30 are reset. It will be appreciated that, in principle, the rate of sending ($\Sigma\Delta X$, $\Sigma\Delta Y$) to the computer could be slow enough that during one accumulation of ($\Sigma\Delta X$, $\Sigma\Delta Y$) the mouse could switch back and forth between the two sources of motion: ($\Delta X_1$, $\Delta Y_1$) and ($\Delta X_2$, $\Delta Y_2$). It is not terribly likely, but it could happen, a the block diagram 29 accommodates that possibility.

And while were are at the interface, we might as well mention that the ($\Sigma\Delta X$, $\Sigma\Delta Y$) sent to the computer is probably not in units of pixels (although it could be), but is most likely in units of tics, where there are some number (say, four) of tics to the pixel. This is yet another reason why an occasional lost count (say, during a change of which Optical Navigation Circuit is in use) is not a worrisome circumstance.

Each Optical Navigation Circuit (14, 15) produces at least one Figure Of Merit Signal. In the figure these are Figure Of Merit #1 (18) and Figure Of Merit #2 (19). These Figure Of Merit Signals are coupled to a Navigation Selection Circuit 21, that in turn produces the signal Navigation Select 24 that is applied to the MUX 25. We now digress briefly to explain the origins of the Figure Of Merit Signals.

A complete description is set out in the incorporated '544 Application, but a brief summary is as follows: The navigation process involves the production of an array of nine correlation values representing the degree with which a sample image agrees (correlates with) a central (present or predicted) reference image position and shifts of position thereof, up and down and left and right. If more shifts are allowed, there may be twenty-five values in the correlation array. Let's stick with nine, which is consistent with our low cost approach. Call the values of the array CS1 through CS9, with CS5 being in the middle of a three by three matrix whose starting rows are, say, CS1, CS4 and CS7. CS1, CS4 and CS7 are a column aligned with, as are the other columns, one of the axes, while CS1, CS2 and CS3 are a row associated with the other axis (as are the other rows). The correlation array may be thought of as describing a correlation surface, or perhaps a bowl, depending upon the convention in use (essentially the direction from which it is viewed). When the Optical Navigation Circuit is tracking without difficulty (navigating with effective prediction) the central value of the correlation array (CS5) is surrounded by values (CS1–CS4 and CS6–CS9) that are either all larger or all smaller (again, depending upon conventions in use). The heart of the navigation process is a servo that shifts images to keep the correlation centered; the record of its efforts to do so are an indication of mouse motion. What we are calling a Figure of Merit Signal is preferably related to a metric used by the Optical Navigation Circuit to select from among various spatial filters, and is a further use of the correlation surface.

The mechanism that predicts the best spatial filter to use analyzes the shape of the correlation surface by detecting when the correlation surface develops ridges, instead of having an isolated peak. We note that ridges could appear in two ways: aligned with the axes and diagonally. With that in mind, we define the following two metrics:

$$AR=\mathcal{F}\{CS8-CS4+CS2-CS6\} \qquad (1)$$

$$DR=\mathcal{F}\{CS7-CS9+CS3-CS1\} \qquad (2)$$

The metric AR (for Axial Ridge) indicates presence of a ridge that runs in a direction parallel with one of the axes. If the absolute value of AR gets above a certain threshold (say, 15% or 20% of the maximum value of a cell in the correlation array), then we become suspicious of how well the filter in use is performing. The "raw" component of AR (the sum of the two differences within the braces) is filtered by an exponential or auto-regression mechanism ($\mathcal{F}$) to retard its rate of change by a suitable time constant. Furthermore, only images whose separations in the X and Y axes are small enough to imply a good correlation surface are used to calculate AR. The idea is that AR will be used as input to a servo-control mechanism, the image data is apt to be somewhat noisy, and we don't want to the servo to be too easily "spooked" by an isolated random excursion in the data. The other metric DR (Diagonal Ridge) indicates the presence of a ridge that runs in a direction diagonal with the axes, and is calculated with restricted input and filtered in the same manner as is AR. It, too, has an associated threshold for creating suspicion. And while we could steer an image filter selection mechanism from these two metrics considered individually, we might also combine them into one indicator, thus:

$$RM=\sqrt{(AR^2+DR^2)} \qquad (3)$$

RM (Ridge Metric) will get larger as either of AR or DR get larger in magnitude, and although there are other ways to take note of the individual values of AR and DR, RM is a convenient way to unify a common meaning of those two metrics into a single indicator. We also note that the signs of AR and DR contain useful information. If we assume that in a system of the sort we have been describing that a correlation surface can get ridges (or the bowl—as viewed from below—can get troughs), then we can also expect that a properly operating system will not experience, after suitable filtering, non-transient troughs in its correlation surface (or ridges in a bowl). We decline to offer a rigorous proof of this, but it is indeed the case. Anyhow, it follows that if the Y axis is in the CS2–CS5–CS8 direction, then AR>0 implies that there is a ridge along that axis. If AR<0 it implies that there is a ridge along the X axis. The sign of DR can likewise be interpreted to distinguish between the two possible diagonal ridges.

Our present purpose is well served if we take the value of RM from Optical Navigation Circuit #1 for use as Figure Of Merit #1 (18), and the value of RM from Optical Navigation Circuit #2 for use as Figure Of Merit Signal #2 (19). We assume that each Optical Navigation Circuit is free to do its own thing as far selecting a spatial filter is concerned, but then we will use the relation between the values of RM from each to decide which Optical Navigation Circuit to use for sending ($\Delta X$, $\Delta Y$) values 26 to the interested environment. We are assisted in this by there being (by design) a known range of values that each RM Signal (Figures Of Merit 18 and 19) can assume.

We should also point out that other information can be obtained from the shape of the correlation surface. For example, a generally flat correlation surface means that there are no navigable features within the field of view. It may be desirable to include detection of this condition in the production of the Figure of Merit signals 18 and 19.

What the Navigation Selection Circuit 21 does is fairly straightforward, then. It determines which is the larger of the two Figures Of Merit, or perhaps to prevent thrashing, imposes some hysteresis on the process: say, that the larger needs to be in excess of the other by five percent, or some other threshold. In any event, the winning Figure Of Merit Signal causes the Navigation Select Signal 24 to switch MUX 25 to pass ($\Delta X_1$, $\Delta Y_1$) as ($\Delta X$, $\Delta Y$) when Figure Of Merit #1 (18) wins, and ($\Delta X_2$, $\Delta Y_2$ as ($\Delta X$, $\Delta Y$) when Figure Of Merit #2 (19) wins. In an alternate embodiment, the Navigation Selection Circuit 21 might decline to change the Navigation Select Signal 24 if both Figures Of Merit are sufficiently large (i.e., unless there is an indication that there is potentially some genuine distress for one of the Optical Navigation Circuits).

We now turn to the issue of transformation by rotation of the coordinates from Optical Navigation Circuit #2 by the Coordinate Rotator Circuit 20. We employ, of course, the usual relationship developed and described in any comprehensive text on analytic geometry:

$$x_{old} = x_{new} \cos\theta - y_{new} \sin\theta \tag{4a}$$

$$y_{old} = x_{new} \sin\theta + y_{new} \cos\theta \tag{4a}$$

Or, $$x_{new} = x_{old} \cos\theta + y_{old} \sin\theta \tag{5a}$$

$$y_{new} = -x_{old} \sin\theta + y_{old} \cos\theta \tag{5b}$$

Where the subscripts "old" and "raw" are associated together, as are the subscripts "new" and "2".

In the case were the angle $\theta$ is 45°, then the various sines and cosines are each 0.707 . . . , and the basic computation is fairly straightforward, in an arithmetic sense. There is a bit more involved here than just a minor operation with arithmetic, however. To see why, let us consider what would be the simple case (although it does not obtain). Suppose the coordinates from the Optical Navigation Circuit #2 to be rotated were not incremental, but absolute; that is, are stated with respect to some fixed origin that does not change. Then they simply could be transformed by rotation, each as they are produced. There might be some round-off error owing to finite arithmetic, but its effect would be limited (local) to each point, and would not accumulate as a sequence of points was processed.

The incremental situation we are actually faced with is not so tidy. The mouse interface requires that we transmit signed integers for ($\Sigma\Delta X$, $\Sigma\Delta Y$). The ($\Delta X_1$, $\Delta Y_1$) and ($\Delta X_{raw}$, $\Delta Y_{raw}$) provided by Optical Navigation Circuits are integers and are correct for their level of precision. We may accumulate ($\Delta X_1$, $\Delta Y_1$) to ($\Sigma\Delta X$, $\Sigma\Delta Y$) as needed without worry.

But the ($\Delta X_2$, $\Delta Y_2$) produced by rotation from ($\Delta X_{raw}$, $\Delta Y_{raw}$) is another matter, as explained next.

Very often ($\Delta X_{raw}$, $\Delta Y_{raw}$) are not very large, with say, an absolute value of around ten to twenty or less. It will often be the case that a resulting small-valued rotated coordinate (say, in the range of one to ten, or whatever) is rounded up or down to the next integer to produce ($\Delta X_2$, $\Delta Y_2$). In and of itself, this is not surprising, nor is it bad. The mouse driver needs an integer. But there are certain angles, where if the mouse is moved along them on a straight line, that the rounding will be repeated, and will be sizable percentage of a count (for example, rounding 5.45 to 5 instead of rounding 5.045 to 5). If every instance of incremental coordinates is treated as if it were the only increment (i.e., as though the previous coordinate were the origin itself), then round-off errors would never be reconciled as a totality, and would instead accumulate as progressive error by being "dropped" (never having coordinate-to-coordinate influence) as a sequence of ($\Delta X_2$, $\Delta Y_2$)'s were accumulated to become part of ($\Sigma\Delta X$, $\Sigma\Delta Y$). A corresponding class of behaviors also exits for rounding up, instead of down. That is, the screen pointer motion would not be proportional to the motion of the mouse, and it could be noticed by the user. It is not so much that screen pointer movement "gets stuck" as when grain-induced mouse dementia occurs, as that the pointer seems at times to go slower or faster in one axis than is ususal.

One way to cure this is for the Coordinate Rotator 20 to periodically treat one of the incoming ($\Delta X_{raw}$, $\Delta Y_{raw}$) coordinates as if it were an origin for points that follow. It then accumulates subsequent ($\Delta X_{raw}$, $\Delta Y_{raw}$) coordinates into ($\Sigma X_{raw}$, $\Sigma Y_{raw}$) coordinate values. As each instance of accumulation is performed its values can be rotated and, in principle, then rounded independently without error accumulation.

However, these accumulated and then rotated coordinates must then be converted back into a corresponding stream of incremental coordinates. To do this without re-introducing the same problem we can for the latest and next to latest un-rounded versions of the rotated accumulated values, take their difference, round it, and use it as ($\Delta X_2$, $\Delta Y_2$); and A different ($\Delta X_{raw}$, $\Delta Y_{raw}$) can be taken as the next temporary origin within the Coordinate Rotator Circuit when the number of accumulated coordinates reaches some convenient number, say twenty-five, fifty or one hundred, at the expiration of some time interval, or when the accumulation begins to approach some upper limit in absolute value. If it could be assured that there would be no arithmetic overflow in the meantime, then a new origin could be taken each time the Navigation Selection Circuit selected ($\Delta X_2$, $\Delta Y_2$) as the source for ($\Delta X$, $\Delta Y$).

Another way to solve the problem is to leave the sequence of integer ($\Delta X_{raw}$, $\Delta Y_{raw}$)'s incremental, rotate them with the introduction of sufficient fractional resolution to create an accurate but un-rounded sequence of ($\Delta X_2$, $\Delta Y_2$)'s, then as part of creating rounded versions carry forward an accumulated and as yet unaccounted-for fractional value that was rounded off, and add it into the next incremental value in the sequence before it is then rounded off and sent out as the next integer ($\Delta X_2$, $\Delta Y_2$).

Finally, another solution to the problem is to have one of the Optical Navigation Circuits do the rotation internally, before it releases them to an environment outside itself. This approach is perhaps not the quickest nor the least expensive, but on the other hand how those dimensions are measured can vary significantly from one organization to the next. It would certainly work, and there would be plenty of precision available to produce an artifact-free sequence of incremental coordinates. In this case the block diagram of FIG. 3 would revert to the way it would appear if both sets of axes were parallel (i.e., the Coordinate Rotator Circuit 20 would be absent).

We claim:

1. A pointing device for a computer system, the pointing device comprising:

a first optical navigation circuit optically coupled to a work surface and producing first pointer increment signals indicative of motion in orthogonal directions over the work surface and a first figure of merit signal indicative of a level of confidence to be placed in the correctness of the first pointer increment signals;

a second optical navigation circuit optically coupled to the work surface and producing second pointer increment signals indicative of motion in orthogonal directions over the work surface and a second figure of merit signal indicative of a level of confidence to be placed in the correctness of the second pointer increment signals;

a navigation selection circuit coupled to the first and second figure of merit signals and producing a navigation selection signal that indicates which of the first and second figure of merit signals is the more favorable;

a selection circuit coupled to the first and second pointer increment signals and to the navigation selection signal, and producing at an output definitive pointer increment signals corresponding to one of the first and second pointer increment signals in accordance with the navigation selection signal; and an interface having an input coupled to the definitive pointer interface signals and an output coupling corresponding signals to the computer system.

2. A pointing device as in claim 1 wherein the orthogonal directions for the second optical navigation circuit are inclined at an angle of inclination to the orthogonal directions of the first optical navigation circuit, and further comprising a coordinate rotation circuit that: (a) has an input coupled the second pointer increment signals produced by the second optical navigation circuit; (b) rotates coordinate components of those second pointer increment signals by the angle of inclination to produce rotated coordinates; and (c) produces at an output rotated second pointer increment signals coupled to the selection circuit in place of unrotated second pointer increment signals.

3. A pointing device as in claim 2 wherein the angle of inclination is forty-five degrees.

4. A pointing device as in claim 1 wherein at least one of the first and second figure of merit signals is derived from an inspection of the values of an associated correlation surface.

5. A pointing device as in claim 1 further comprising a lens assembly that optically couples both the first and second optical navigation circuits to the work surface.

* * * * *